United States Patent
Pàolini et al.

(10) Patent No.: US 6,791,636 B2
(45) Date of Patent: Sep. 14, 2004

(54) BACKLIGHT FOR A COLOR LCD

(75) Inventors: Steven Pàolini, Saratoga, CA (US); Gerard Harbers, Anjervallie (NL); Wayne L. Snyder, Palo Alto, CA (US)

(73) Assignee: Lumilecs Lighting U.S., LLC, San Jose, CA (US)

( * ) Notice: Subject to any disclaimer, the term of this patent is extended or adjusted under 35 U.S.C. 154(b) by 247 days.

(21) Appl. No.: 09/854,014

(22) Filed: May 10, 2001

(65) Prior Publication Data

US 2002/0167624 A1 Nov. 14, 2002

(51) Int. Cl.[7] .............................................. G02F 1/1335
(52) U.S. Cl. ........................... 349/61; 349/65; 349/62; 349/64; 349/112; 349/113; 349/114
(58) Field of Search .............................. 349/61, 65, 62, 349/64, 68, 112, 113, 114, 67, 162

(56) References Cited

U.S. PATENT DOCUMENTS

| | | | | |
|---|---|---|---|---|
| 5,406,268 A | * | 4/1995 | Fullmer ................. | 340/815.42 |
| 5,608,554 A | | 3/1997 | Do et al. ................ | 349/70 |
| 6,008,871 A | * | 12/1999 | Okumura ................ | 349/61 |
| 6,111,696 A | * | 8/2000 | Allen et al. ............. | 359/495 |
| 6,115,016 A | * | 9/2000 | Yoshihara et al. ........ | 345/88 |
| 6,256,447 B1 | * | 7/2001 | Laine ..................... | 385/146 |
| 6,521,879 B1 | * | 2/2003 | Rand et al. .............. | 250/205 |
| 6,540,377 B1 | * | 4/2003 | Ota et al. ................ | 362/231 |
| 6,667,782 B1 | * | 12/2003 | Taira et al. .............. | 349/65 |
| 2001/0052891 A1 | * | 12/2001 | Yoshihara et al. ........ | 345/102 |
| 2002/0000960 A1 | * | 1/2002 | Yoshihara et al. ........ | 345/87 |
| 2002/0015297 A1 | * | 2/2002 | Hayashi et al. .......... | 362/27 |
| 2002/0070914 A1 | * | 6/2002 | Bruning et al. .......... | 345/102 |
| 2002/0158574 A1 | * | 10/2002 | Wolk et al. .............. | 313/504 |
| 2002/0163606 A1 | * | 11/2002 | Kitai et al. ............... | 349/98 |
| 2002/0171617 A1 | * | 11/2002 | Fuller .................... | 345/102 |
| 2002/0191127 A1 | * | 12/2002 | Roberts et al. ........... | 349/61 |

* cited by examiner

*Primary Examiner*—Minhloan Tran
*Assistant Examiner*—Fazli Erdem
(74) *Attorney, Agent, or Firm*—Patent Law Group LLP; Brian D. Ogonowsky (57) ABSTRACT

In one embodiment, a color, transmissive LCD uses red, green, and blue LEDs as the light source. The red LED is optically coupled to a first edge of a rectangular light guide; the green LED is optically coupled to a second edge of the light guide; and the blue LED is optically coupled to a third edge of the light guide. Three sets of deformities in the light guide selectively direct the R, G, and B light out of the front surface of the light guide. The R, G, and B LEDs are constantly on and there is no color filtering. In another embodiment, a blue light LED is optically coupled to one or more edges of a light guide, and phosphor strips are placed on a surface of the light guide coinciding with the red and green pixel columns. Deformities below the red and green phosphor strips and below the blue pixel areas direct blue light to the backs of the phosphor strips and to the blue pixel areas. If an ultraviolet light LED is used, phosphor strips for the blue pixel areas would also be used.

15 Claims, 4 Drawing Sheets

BACKLIGHT FOR A COLOR LCD

FIELD OF THE INVENTION

This invention relates to color liquid crystal displays and, in particular, to a technique for backlighting a color liquid crystal display.

BACKGROUND

Liquid crystal displays (LCDs) are commonly used in battery operated equipment, such as cell phones, personal digital assistants (PDAs), and laptop computers, and are replacing bulky CRTs as television screens and computer monitors. Presently, drawbacks of such LCDs include limited brightness, low efficiency, and limited viewing angle. LCDs can be monochrome or color and can be transmissive or reflective. The present invention deals with a color, transmissive LCD that requires backlighting, where the backlighting contains red, green, and blue components.

Figure 1:
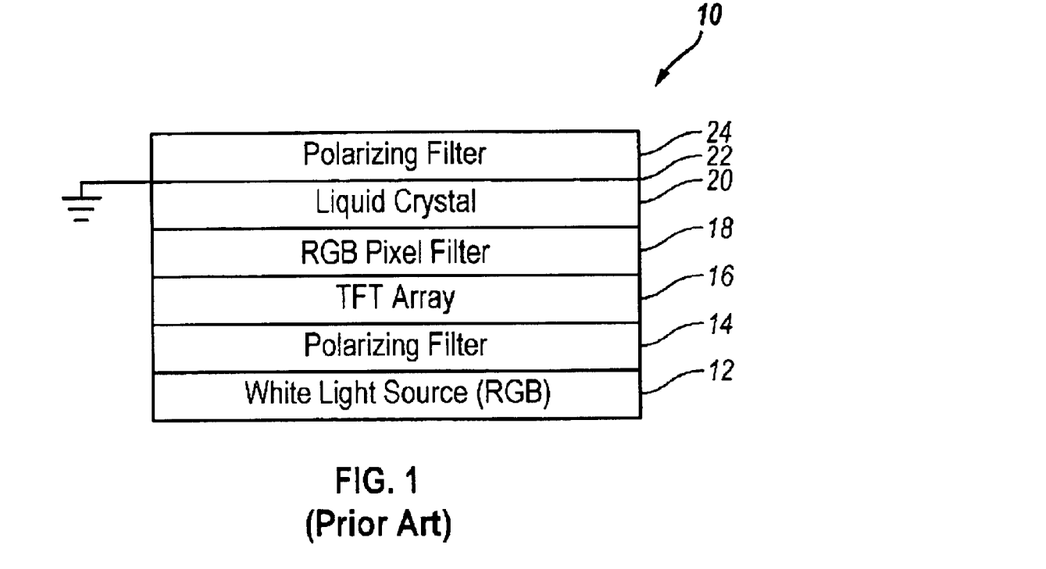
FIG. 1 is a cross-section of a prior art color transmissive LCD using a constantly on white light source.

FIG. 1 is a cross-sectional view of a small portion of a prior art color, transmissive LCD. There are other types of color, transmissive LCD structures. The structure of FIG. 1 will be used to identify certain disadvantages of prior art LCDs that are avoided by the present invention.

In FIG. 1, an LCD 10 includes a white light source 12 to provide backlighting for the upper LCD layers. A common source for white light is a fluorescent bulb. Another white light source is a combination of red, green, and blue light emitting diodes (LEDs) whose combined light forms white light. Other white light sources are known. These white light sources must provide homogeneous light to the back surface of the display.

A popular technique for providing such a homogeneous white light is to optically couple the fluorescent bulb or LEDs to a light guide, such as by optically coupling the light source to one or more edges of a sheet of clear plastic. The sheet has deformities that bend the light approximately normal to the top surface of the sheet so that light is emitted from the surface. Examples of such deformities include ridges in the bottom surface, reflective particles embedded into the plastic sheet, or a roughening of the top or bottom surface of the sheet. The deformities cause a quasi-uniform plane of light to be emitted out the front surface of the light guide. A non-specular reflector may be placed behind the back surface of the light guide to improve brightness and uniformity.

It is also common to not use any light guide, wherein a light source positioned behind the display is provided with appropriate diffusers to uniformly distribute the light across the display.

A polarizing filter 14 linearly polarizes the white light. The polarized white light is then transmitted to a transparent thin film transistor (TFT) array 16 having one transistor for each pixel. TFT arrays are extremely well known and need not be further described.

The light output from the TFT array 16 is then filtered by an RGB pixel filter 18. The RGB pixel filter 18 may be comprised of a red filter layer, a green filter layer, and a blue filter layer. The layers may be deposited as thin films. As an example, the red filter contains an array of red light filter areas coinciding with the red pixel areas of the display. The remaining portions of the red filter are clear to allow other light to pass. Accordingly, the RGB pixel filter 18 provides a filter for each R, G, and B pixel in the display.

Above the RGB pixel filter 18 is a liquid crystal layer 20, and above liquid crystal layer 20 is a transparent conductive layer 22 connected to ground. The absence of an electrical field across a pixel area of the liquid crystal layer 20 causes light passing through that pixel area to have its polarization rotated orthogonal to the incoming polarization. An electrical field across a pixel area of the liquid crystal layer 20 causes the liquid crystals to align and not affect the polarity of light. Selectively energizing the transistors controls the localized electric fields across the liquid crystal layer 20. Both normally open (white) and normally closed (black) shutters are used in different displays.

A polarizing filter 24 only passes polarized light orthogonal to the light output from the polarizing filter 14. Therefore, the polarizing filter 24 only passes light that has been polarized by a non-energized pixel area in the liquid crystal layer 20 and absorbs all light that passes through the energized portions of the liquid crystal layer 20. The magnitudes of the electric fields across the liquid crystal layer 20 control the brightness of the individual R, G, and B components to create any color. In this manner, any color image may be presented to the viewer by selectively energizing the various transistors in the TFT array 16.

Other types of LCDs substitute a passive conductor grid for the TFT array 16, where energizing a particular row conductor and column conductor energizes a pixel area of the liquid crystal layer at the crosspoint.

The RGB pixel filter 18 inherently filters two-thirds of all light reaching it, since each filter only allows one of the three primary colors to pass. This is a significant factor in the generally poor efficiency of the prior art LCDs. The overall transmissivity of the LCD layers above the white light source 12 is on the order of 4–10%. What is needed is a technique for increasing the brightness of an LCD output without requiring additional energy for the white light source.

Figure 2:
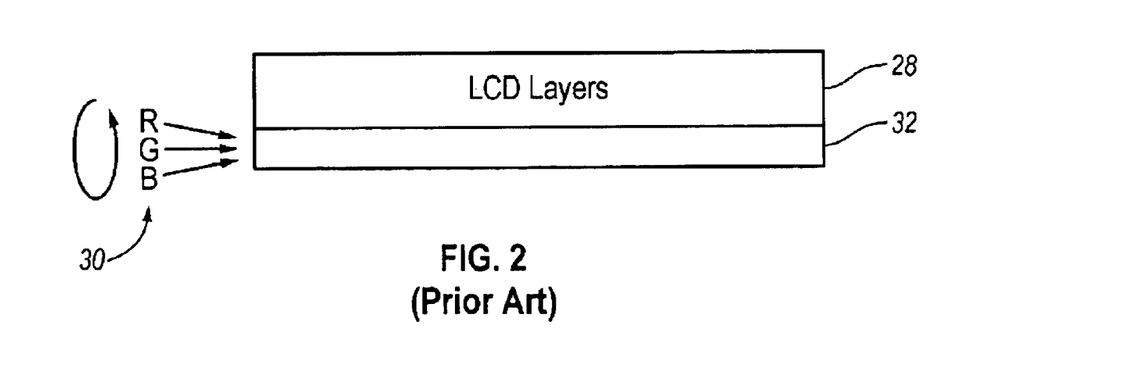
FIG. 2 is a cross-section of a prior art LCD using separate red, green, and blue light sources that are sequentially energized.

FIG. 2 illustrates another prior art color LCD. The layer labeled LCD layers 28 may include all the layers in FIG. 1 except for the RGB pixel filter 18 or may be any other layers for implementing an LCD. FIG. 2 does not use a white light source but instead sequentially energizes red, green, and blue light sources 30, such as red, green, and blue LEDs. A light guide 32 typically receives the RGB light along one or more of its edges and bends the light toward the LCD layers 28 using any one of a number of well known techniques. Sequentially energizing the RGB light sources requires synchronization with the energization of the TFT array. Additionally, to avoid any perceivable flicker, the R, G, and B light sources must each be energized at a frequency of at least 180 Hz to accommodate all three colors sequentially at 60 frames per second. The switching speed may need to be even faster to account for motion artifacts such as those caused by the viewer moving his head while viewing the display. Problems with slow switching speed of the shutter (LC+TFT) and motion artifacts will likely keep this approach impractical for at least several more years.

SUMMARY

In one embodiment, a color, transmissive LCD uses red, green, and blue LEDs as the light source. The red LED is optically coupled to a first edge of a rectangular light guide; the green LED is optically coupled to a second edge of the light guide; and the blue LED is optically coupled to a third edge of the light guide.

Deformities in the light guide direct light out of the front surface of the light guide. A first set of deformities is arranged to only direct the red light out of the light guide in the red pixel areas of the display. A second set of deformities is arranged to only direct the green light out of the light guide in the green pixel areas of the display. And, a third set of deformities is arranged to only direct the blue light out of the light guide in the blue pixel areas of the display. In one embodiment, these deformities are ridges having angled surfaces generally facing the direction of the incident light to be directed out of the light guide. In such an embodiment, there are three sets of ridges, each set having angled surfaces orthogonal to the other sets. The R, G, and B LEDs are constantly on and there is no color filtering.

In one embodiment, the LCD has red pixels arranged in a column, green pixels arranged in an adjacent parallel column, and blue pixels arranged in a column adjacent to the green pixels. The pattern repeats. For this type of display, the deformities associated with each of the colors in the light guide are arranged in strips coinciding with the columns of pixels for the particular color reflected by the deformities.

In another embodiment, a blue LED is optically coupled to one or more edges of a light guide, and phosphor strips are placed on a surface of the light guide coinciding with the red and green pixel columns. Deformities below the red and green phosphor strips reflect blue light to the backs of the phosphor strips. The phosphor strips coinciding with the red pixel columns generate red light when irradiated with the blue light from the blue LED. The phosphor strips coinciding with the green pixel columns generate green light when irradiated with the blue light. In areas coinciding with the blue display pixels, no phosphor strips are used, but instead, deformities in the light guide are used to leak out the blue light.

If an ultraviolet light LED is used as the light source, phosphor strips for the blue pixel columns are used, which generate blue light when irradiated with ultraviolet light.

Since the inventive backlighting techniques allow the light source(s) to be on 100% of the time, unlike the technique shown in FIG. 2, and no RGB filter pixel is required, unlike the technique shown in FIG. 1, the LCDs of this invention overcome the various drawbacks previously described.

DETAILED DESCRIPTION

Figure 3:
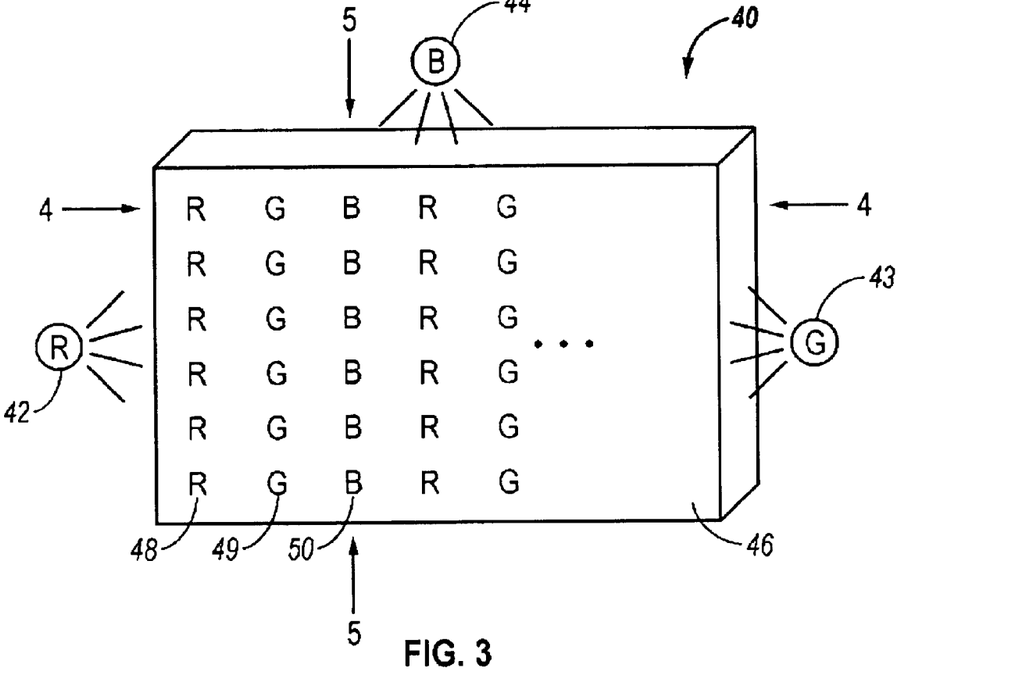
FIG. 3 is a perspective view of a representation of a light guide having deformities arranged for selectively leaking light only from designated light sources located along edges of the light guide.

FIG. 3 is a front perspective view of a light guide 40 in accordance with one embodiment of the invention. The light guide 40 is preferably formed of high optical quality plastic or glass. The thickness of the light guide 40 is dependent upon various factors, such as the size of the LCD and its required mechanical properties.

A red light LED 42 is optically coupled to a left edge of the light guide 40. Multiple red light LEDs may be used depending upon the size of the display and the desired brightness. Any technique for improving the optical coupling between an LED and the light guide may be employed, such as using a high index epoxy or embedding the LEDs in the edges of the light guide. One or more lenses may also be employed to optically couple the LED light to the light guide to provide the desired degree of light dispersion.

A green light LED 43 is optically coupled to the right edge of the light guide 40. And, a blue light LED 44 is optically coupled to the top edge of the light guide 40. Any number of green or blue LEDs may be used, and any of the edges may serve as the input source for any of the primary colors.

Deformities in the light guide 40 are designed to reflect light coming from a particular edge through the front surface 46 of the light guide 40. These deformities will be discussed with respect to FIGS. 4 and 5. The deformities 48 for reflecting or "leaking out" the red light are indicated with the letter R; the deformities 49 for reflecting out the green light are designated with the letter G; and the deformities 50 for reflecting out the blue light are designated with the letter B. In the particular embodiment shown in FIG. 3, it is assumed that the display pixels are arranged in columns, and each individual letter R, G, and B represent deformities coinciding with pixels of that color in the display. Instead of isolated deformities for each pixel, deformities may be formed in a strip, as appropriate, for the entire column of R, G, or B pixels.

Suitable lenses 60 (FIG. 4) may be formed on the top surface 46 of the light guide 40 to collimate any light for the particular pixel areas to increase brightness and minimize cross-talk.

Figure 4:
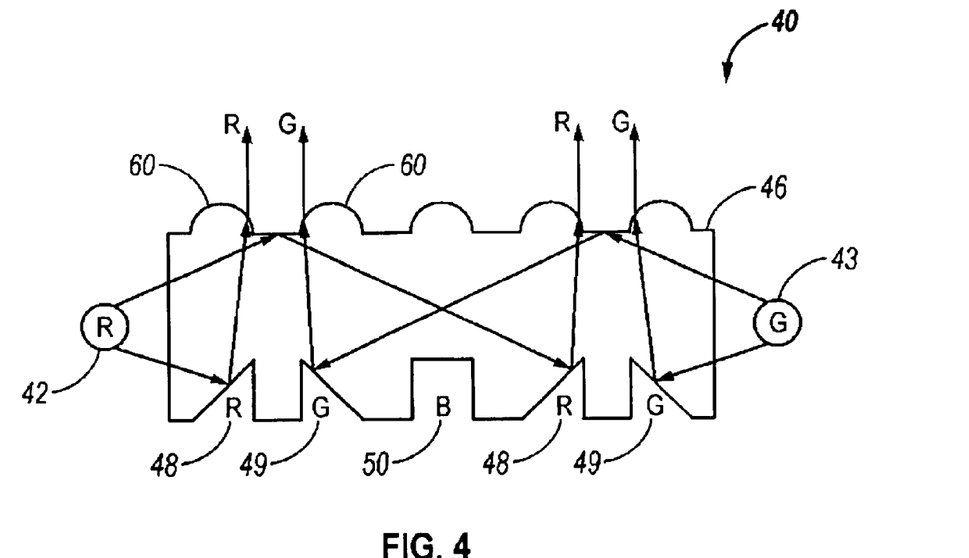
FIG. 4 is a cross-sectional view of a portion of the light guide along line 4—4 of FIG. 3 illustrating deformities for selectively leaking out red, green, and blue light.

FIG. 4 is a cross-sectional view of a portion of the light guide 40 along line 4—4 of FIG. 3. In this particular embodiment, the deformities are ridges formed in the back surface of the light guide 40 that reflect light to the top surface of the light guide 40 only when the light is incident upon the ridges from a particular direction. The deformities 48 for reflecting out the red light from the red light LED 42 have angled surfaces that reflect light entering from the left edge of the light guide 40 upward (at less than the critical angle to the surface) but do not so reflect light coming from a different direction. Similarly, the deformities 49 have angled surfaces that reflect upward the green light entering from the right edge of the light guide 40 but do not so reflect light coming from any other edge. The deformities 50 for the blue light have an angled surfaces facing into the plane of the FIG. 4 drawing so cannot be seen.

Figure 5:
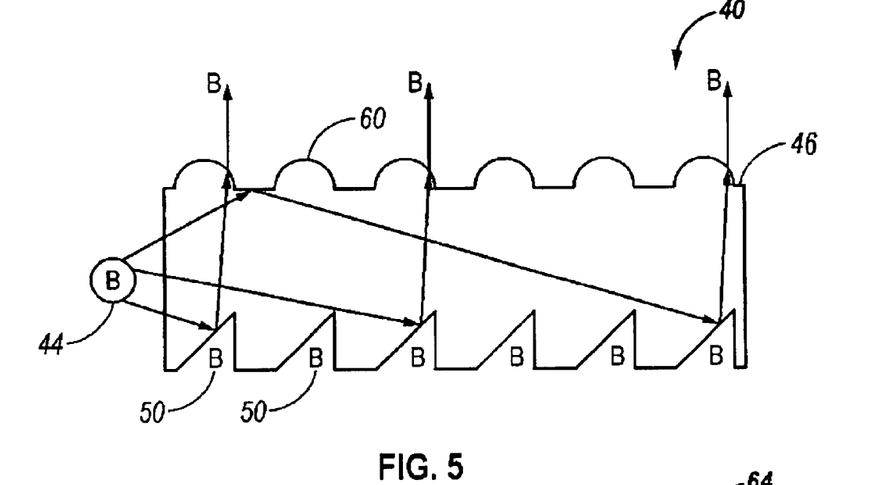
FIG. 5 is a cross-sectional view of a portion of the light guide along line 5—5 of FIG. 3.

FIG. 5 is a cross-sectional view of the light guide 40 along line 5—5 of FIG. 3 showing the angled surface of the deformities 50 for reflecting upward the blue light entering from the top edge in FIG. 3.

To prevent light from reflecting off an internal edge of the light guide 40 (and undesirably redirecting the light from a particular light source), the edges may be coated with a light-absorbing material.

Figure 6:
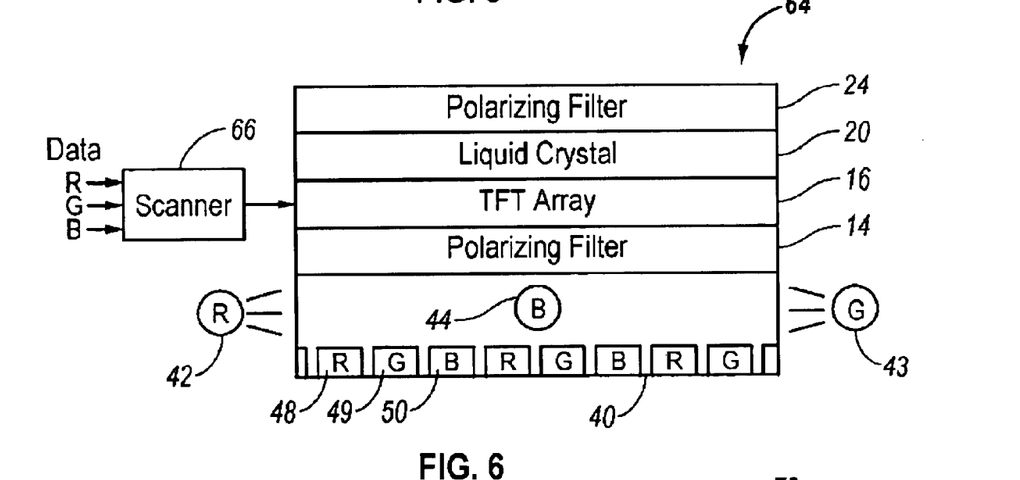
FIG. 6 is a cross-section of a portion of an LCD illustrating the use of the light guide of FIG. 3.

FIG. 6 is a cross-sectional schematic view of a portion of an LCD 64 utilizing the upper layers of the LCD of FIG. 1, except for the RGB pixel filter 18. The light guide 40 of FIG. 3 is used as the backlight for the LCD 64. A conventional scanner 66, well known to those skilled in the art, receives red, green, and blue data from a conventional circuit and selectively energizes the transistors in the TFT array 16 using known row and column addressing circuitry. Using the technique of FIG. 6, in contrast to FIG. 2, there is no requirement that a first scan of the array be only for the red pixels, for example, but instead, the red, green, and blue pixels may be sequentially "shuttered" in a serpentine fashion since the red, green, and blue backlighting is constantly on. Further, any type of control of the TFT array 16 (or a passive conductor grid) may be used, including energizing more than one pixel at a time.

It is desirable for the backlight illuminance of the polarizing filter 14 to be set so that the ratio of light from each color achieves the desired white point. This is an important feature that LEDs provide over fluorescent lamps where the ratios of RGB light are fixed. To obtain the desired illumination characteristics for all three colors incident on the polarizing filter 14, the LED energizing signals may be adjusted.

The deformities 48–50 may take various shapes and may be formed in the light guide surface or internal to the light guide. Examples of deformities are described in U.S. Pat. Nos. 6,072,551; 5,876,107; 5,857,761; and 4,573,766, all incorporated herein by reference.

Ideally, the R, G, and B maximum intensities output by the LCD create white light. To make white light, about 50% of the light needs to be green independent of the light source. The relative efficiencies of the LEDs may change over time, so a dynamic adjustment (e.g., using photodetector feedback) can be made to the energizing signals to compensate for any change in brightness.

Standard pixel arrangements for monitors and the like include an HDTV standard of 1280×1024 pixels or lower resolutions of 640×480 and 320×240. The pitch of the pixels is of course determined by the desired size of the LCD and the number of pixels. For simple displays, such as in cell phones, fewer pixels may be acceptable.

Additional information about liquid crystal displays may be found in the books entitled "Liquid Crystal Flat Panel Displays," by William O'Mara, 1993, published by Van Nostrand Reinhold, and "Color TFT Liquid Crystal Displays," by T. Yamazaki, published SEMI, incorporated herein by reference.

Using the technique shown in FIG. 6, the 66% loss incurred by the RGB filter 18 of FIG. 1 is eliminated, and the constantly on red, green, and blue LEDs avoid the drawbacks of high switching speed, flicker, and synchronization, as compared to FIG. 2.

In certain embodiments, filters or masks between the light guide 40 and the liquid crystal layer 20 may be used to minimize cross-talk between adjacent colors emitted by the light guide 40.

Figure 7:
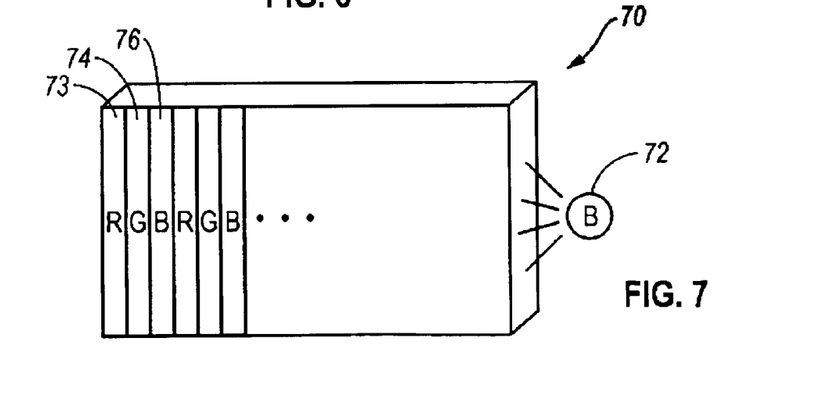
FIG. 7 is a perspective view of a light guide incorporating phosphor-containing strips that generate light of either red or green when irradiated with blue light from a blue light LED optically coupled to an edge of the light guide.

In another embodiment of a light guide, shown in FIG. 7, an optically clear light guide 70 has a blue LED 72 optically coupled to an edge of the light guide 70. Additional blue LEDs may be coupled to the same edge or any of the other edges.

A first phosphor material 73 is deposited on the surface of the light guide 70 in those areas where it is desired to emit a red light, corresponding to the red pixels areas of the display. This phosphor material must be the type that, when irradiated by blue light, generates red light. The phosphor material may be deposited in liquid form using a stencil.

In the embodiment of FIG. 7, it is assumed that the red pixels are arranged in columns; however, the phosphor material may be deposited in other patterns, depending on the intended pixel locations. Deformities in the light guide 70 reflect the blue light entering the edge of the light guide 70 to irradiate the back of the phosphor material.

A second phosphor material 74 is deposited for the green pixels. This phosphor material, when irradiated by blue light, generates green light.

For the blue pixel areas 76, no phosphor material is needed, and the deformities in the light guide 70 reflect the blue light through the top surface of the light guide 70 in the blue pixel areas.

Lenses may be formed on the top surface of the light guide 70 to collimate the red, green, and blue light and minimize cross-talk between the colors.

The red phosphor material 73 may be $SrS:Eu^{2+}$. The green phosphor material 74 may be $SrGa_2S_4:Eu^{2+}$. These phosphors are the same as those deposited on lenses of blue LEDs to form white light (having R, G, and B components) and may have up to 100% quantum efficiency. These phosphors are nicely excitable by the 460 nm blue from commercially available blue LEDs. In one embodiment, a suitable diffuser (e.g., scattering powder) is located at the blue pixel areas 76 so the blue pixels match the viewing angle properties of the red and green pixels.

The phosphor may be deposited from liquid suspension using a stencil. A transparent protective layer may overlie the phosphor layer. The transparent layer may have a roughened surface in the blue pixel areas to increase the viewing angle of the blue pixels.

In one embodiment, the red, green, and blue light areas abut one another on the surface of the light guide 70, so the deformities in the light guide are arranged to uniformly direct the blue light from the LED to the top surface of the light guide 70. If there are spaces between the red, green, and blue columns of pixels, the deformities may be patterned so as to not emit light between the columns. Alternately or in addition, an opaque mask may be formed over the surface of the light guide 70 to prevent light from being emitted out of certain areas of the surface.

Figure 8:
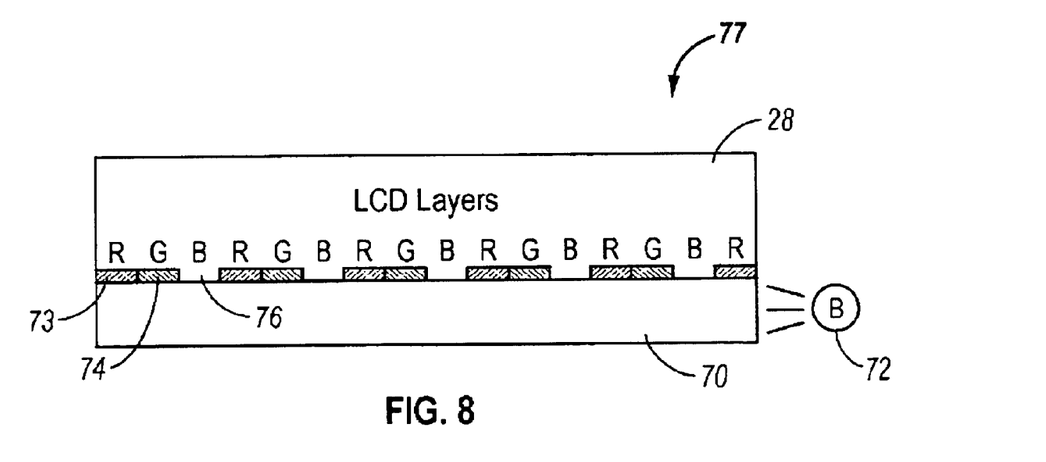
FIG. 8 is a cross-section of a portion of an LCD illustrating the use of the light guide of FIG. 7.

FIG. 8 is a cross-sectional view of an LCD 77 having the various LCD layers 28 (similar to FIG. 2) but using the light guide 70 of FIG. 7.

Figure 9:
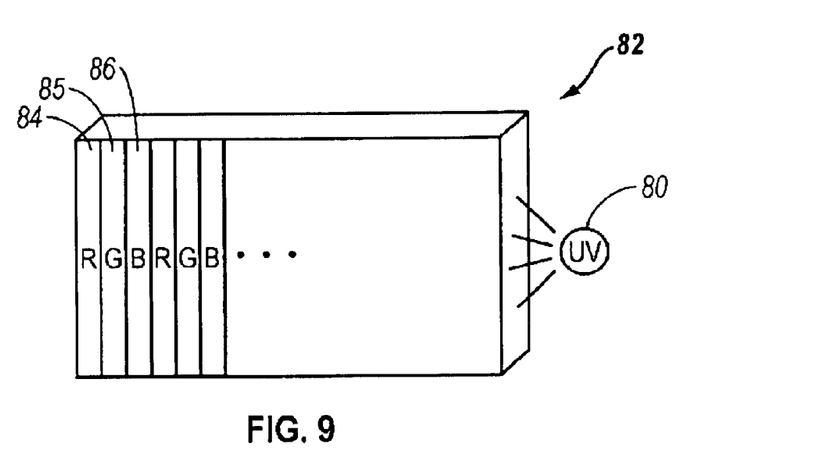
FIG. 9 is a perspective view of a light guide incorporating phosphor-containing strips that generate light of either red, green, or blue when irradiated with ultraviolet light from an ultraviolet light LED coupled to an edge of the light guide.

FIG. 9 illustrates an embodiment, similar to FIG. 7, except an ultraviolet light LED 80 is optically coupled to an edge of the light guide 82. Additional LEDs may be coupled to the edge or other edges of the light guide 82. Three different phosphor materials 84, 85, 86 for generating red, green, and blue light, respectively, upon being irradiated with ultraviolet light are deposited on the surface of the light guide 82 in those areas corresponding to the red, green, and blue pixels of the display. These phosphor materials may be of a conventional type known to those skilled in the art.

Lenses may be formed on the top surface of the light guide 82 to collimate the red, green, and blue light and minimize cross-talk between the colors.

Figure 10:
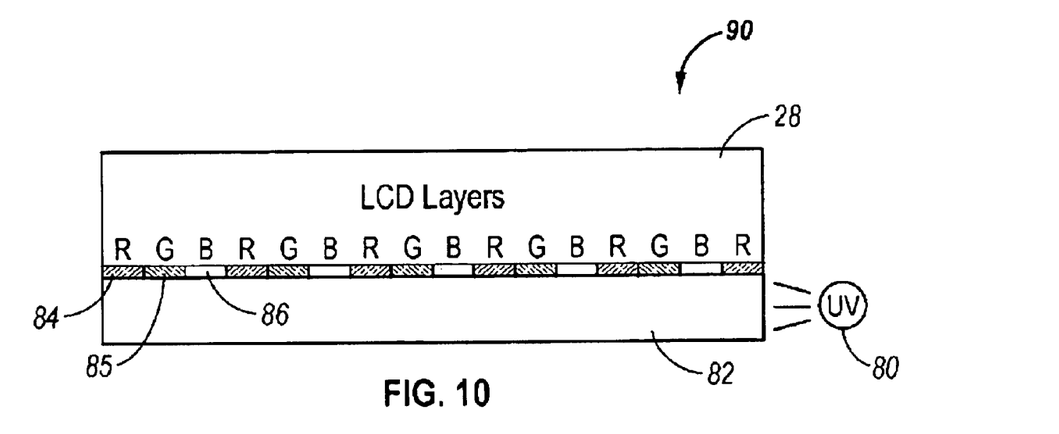
FIG. 10 is a cross-section of a portion of an LCD illustrating the use of the light guide of FIG. 9.

FIG. 10 is a cross-sectional view of an LCD 90 having the various LCD layers 28 (similar to FIG. 2) but using the light guide 82 of FIG. 9.

Numerous issued patents describing light guides and LCDs provide techniques for improving light extraction efficiency, and any of these techniques may be employed, as appropriate, in the present invention. These patents include U.S. Pat. Nos. 6,094,283; 6,079,838; 6,078,704; 6,073,034; 6,072,551; 6,060,727; 6,057,966; 5,975,711; 5,883,684; 5,857,761; 5,841,494; 5,580,932; 5,479,328; 5,404,277; 5,202,950; 5,050,946; 4,929,062; and 4,573,766, all incorporated herein by reference.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A device comprising:
    a backlight for a color liquid crystal display, said backlight comprising:
        at least one light guide having a first surface, an opposing second surface, and a plurality of edges;
        at least one red light emitting diode (LED) optically coupled to a first edge of said light guide;
        at least one green LED optically coupled to a second edge of said light guide; and
        at least one blue LED optically coupled to a third edge of said light guide,
        said light guide including light directing elements, a first set of light directing elements causing light entering said first edge to be directed to exit said first surface in areas corresponding to red pixels in said display, second set of light directing elements causing light entering said second edge to be directed to exit said first surface in areas corresponding to green pixels in said display, and a third set of light directing elements causing light entering said third edge to be directed to exit said first surface in areas corresponding to blue pixels in said display wherein,
        said first of light directing elements include ridges having angled surfaces for receiving light entering said first edge;
        said second set of light directing elements including ridges having angled surfaces orthogonal to said angled surfaces of said first set of light directing elements surfaces for receiving light entering said second edge; and
        said third set of light directing elements includes ridges having angled surfaces orthogonal to said angled surfaces of said first set and said second set of light directing elements surfaces for receiving light entering said third edge.

2. The device of claim 1 further comprising:
    a plurality of layers including a liquid crystal layer.

3. A device comprising:
    a backlight for a color liquid crystal display, said backlight comprising:
        at least one light guide having a first surface, an opposing second surface, and a plurality of edges;
        at least one red light emitting diode (LED) optically coupled to a first edge of said light guide;
        at least one green LED optically coupled to a second edge of said light guide; and
        at least one blue LED optically coupled to a third edge of said light guide,
        said light guide including light directing elements, a first set of light directing elements causing light entering said first edge to be directed to exit said first surface in areas corresponding to red pixels in said display, a second set of light directing elements causing light entering said second edge to be directed to exit said first surface in areas corresponding to green pixels in said display, and a third set of light directing elements causing light entering said third edge to be directed to exit said first surface in areas corresponding to blue pixels in said display wherein,
        said light directing elements are positioned to cause light to leak out of said light guide in areas corresponding to pixel positions.

4. A device comprising:
    a backlight for a color liquid crystal display, said backlight comprising:
        at least one light guide having a first surface, an opposing second surface, and a plurality of edges;
        at least one red light emitting diode (LED) optically coupled to a first edge at said light guide;
        at least one green LED optically coupled to a second edge of said light guide; and
        at least one blue LED optically coupled to a third edge of said light guide,
        said light guide including light directing elements, a first set of light directing elements causing light entering said first edge to be directed to exit said first surface in areas corresponding to red pixels in said display, a second set of light directing elements causing light entering said second edge to be directed to exit said first surface in areas corresponding to green pixels in said display, and a third set of light directing elements causing light entering said third edge to be directed to exit said first surface in areas corresponding to blue pixels in said display wherein,
        said light directing elements are arranged in columns to coincide with columns of pixels.

5. A device comprising:
    a backlight for a color liquid crystal display, said backlight comprising:
        at least one light guide having a first surface, an opposing second surface, and a plurality of edges;
        at least one red light emitting diode (LED) optically coupled to a first edge of said light guide;
        at least one green LED optically coupled to a second edge of said light guide; and
        at least one blue LED optically coupled to a third edge of said light guide,
        said light guide including light directing elements, a first set of light directing elements causing light entering said first edge to be directed to exit said first surface in areas corresponding to red pixels in said display, a second set of light directing elements causing light entering said second edge to be directed to exit said first surface in areas corresponding to green pixels in said display, and a third set of light directing elements causing light entering said third edge to be directed to exit said first surface in areas corresponding to blue pixels in said display wherein,
        said light guide includes lenses for collimating light exiting said light guide.

6. The device of claim 5 wherein there is one lens per pixel in said display.

7. A device comprising:
    a backlight for a color liquid crystal display, said backlight comprising:
        at least one light guide having a first surface, an opposing second surface, and a plurality of edges;
        at least one red light emitting diode (LED) optically coupled to a first edge of said light guide;

at least one green LED optically coupled to a second edge of said light guide; and at least one blue LED optically coupled to a third edge of said light guide, said light guide including light directing elements, a first set of light directing elements causing light entering said first edge to be directed to exit said first surface in areas corresponding to red pixels in said display, a second set of light directing elements causing light entering said second edge to be directed to exit said first surface in areas corresponding to green pixels in said display, and a third set of light directing elements causing light entering said third edge to be directed to exit said first surface in areas corresponding to blue pixels in said display; and a plurality of layers comprising:
a first polarizing filter;
an energizing array;
a liquid crystal layer; and
a second polarizing filter.

8. The device of claim 7 wherein said energizing array is a thin film transistor array.

9. The device of claim 7 wherein said plurality of layers lacks a color filter.

10. A method performed by a color liquid crystal display, said display comprising a plurality of layers including a liquid crystal layer and a backlight comprising at least one light guide having a first surface, an opposing second surface, and a plurality of edges; at least one red light emitting diode (LED) optically coupled to a first edge of said light guide; at least one green LED optically coupled to a second edge of said light guide; and at least one blue LED optically coupled to a third edge of said light guide, said light guide including light directing elements, a first set of light directing elements causing light entering said first edge to be reflected to exit said first surface in areas corresponding to red pixels in said display, a second set of light directing elements causing light entering said second edge to be reflected to exit said first surface in areas corresponding to green pixels in said display, and a third set of light directing elements causing light entering said third edge to be reflected to exit said first surface in areas corresponding to blue pixels in said display, said method comprising:

energizing said red light emitting diode (LED) optically coupled to said first edge of said light guide;

energizing said green LED optically coupled to said second edge of said light guide;

energizing said blue LED optically coupled to said third edge of said light guide; and selectively controlling said liquid crystal layer to display an image comprising a combination of red, green, and blue light.

11. The method of claim 10 wherein said plurality of layers comprises a first polarizing filter, a thin film transistor array, said liquid crystal layer, and a second polarizing filter, said selectively controlling said crystal layer comprising:

selectively activating transistors in said thin film transistor array.

12. A device comprising:

a backlight for a color liquid crystal display comprising:
at least one light guide having a first surface and an opposing second surface;
a light emitting diode (LED) emitting light having a wavelength equal to or less than blue light, said LED being optically coupled to said light guide;
a plurality of first areas on said first surface of said light guide having a first phosphor material that, when irradiated by light emitted by said LED, generate a red light;
a plurality of second areas on said first surface of said light guide having a second phosphor material that, when irradiated by light emitted by said LED, generate a green light; and
deformities formed in said light guide directing light from said LED toward said first surface, said red light and green light emitted by said first areas and said second areas coinciding with red and green pixels in said display.

13. The device of claim 12 wherein said LED emits blue light.

14. The device of claim 12 further comprising third areas on said first surface of said light guide having a third phosphor material that, when irradiated by light emitted by said LED, generates a blue light.

15. The device of claim 14 wherein said LED emits ultraviolet light.

* * * * *

UNITED STATES PATENT AND TRADEMARK OFFICE
CERTIFICATE OF CORRECTION

PATENT NO. : 6,791,636 B2 Page 1 of 1
DATED : September 14, 2004
INVENTOR(S) : Steven Paolini, Gerard Harbers and Wayne L. Snyder It is certified that error appears in the above-identified patent and that said Letters Patent is hereby corrected as shown below:

Title page,
Items [12] and [75], Inventors, cancel "P`aolini" and substitute -- Paolini --.
Item [73], Assignee, cancel "Lumilecs" and substitute -- Lumileds --.

Signed and Sealed this

Fourteenth Day of December, 2004

JON W. DUDAS
*Director of the United States Patent and Trademark Office*